United States Patent [19]
Prescott et al.

[11] Patent Number: 5,421,644
[45] Date of Patent: Jun. 6, 1995

[54] VEHICLE BRAKING SYSTEM

[75] Inventors: Robert D. Prescott, Solihull; Colin F. Ross, Kidderminster, both of United Kingdom

[73] Assignee: Grau Limited, Redditch, United Kingdom

[21] Appl. No.: 222,602

[22] Filed: Apr. 1, 1994

[30] Foreign Application Priority Data

Apr. 3, 1993 [GB] United Kingdom ................ 9306979

[51] Int. Cl.⁶ .................................................. B60T 8/32
[52] U.S. Cl. ........................ 303/100; 188/181 C; 303/102; 303/106; 303/110; 303/96; 303/111; 303/118.1
[58] Field of Search ............. 303/111, 100, 118.1, 303/106, 110, 7, 102, 103, 98, 96, 119.1; 180/197; 364/426.01, 426.02; 188/181 C

[56] References Cited

U.S. PATENT DOCUMENTS

| | | | |
|---|---|---|---|
| 3,794,389 | 2/1974 | Davis et al. | 303/21 |
| 3,909,070 | 9/1975 | Leiber | 303/109 |
| 3,972,568 | 8/1976 | Fleischer | 303/111 X |
| 4,005,910 | 2/1977 | Leiber et al. | 303/96 |
| 4,576,419 | 3/1986 | Leiber | 303/111 X |
| 4,652,060 | 3/1987 | Miyake | 303/111 X |
| 4,852,953 | 8/1989 | Brearley et al. | 303/111 |
| 4,982,806 | 1/1991 | Yoshizawa et al. | 180/197 |

FOREIGN PATENT DOCUMENTS

| | | |
|---|---|---|
| 0122570 | 10/1984 | European Pat. Off. . |
| 3421253 | 12/1984 | Germany . |
| 1538918 | 1/1979 | United Kingdom . |
| 1581943 | 12/1980 | United Kingdom . |

OTHER PUBLICATIONS

Automotive Engineer vol. 18, No.1, Feb./Mar. 1993, p. 24 XP345219.

*Primary Examiner*—Douglas C. Butler
*Attorney, Agent, or Firm*—Leydig, Voit & Mayer, Ltd.

[57] ABSTRACT

A vehicle braking system comprising a controller responsive to wheel speed signals from at least two wheel speed sensors for sensing skid conditions of at least two wheels and for generating skid control instructions; a plurality of wheel brakes responsive to fluid pressure, hereinafter referred to as brake pressure, supplied thereto; a supply device, comprising a common supply valve, for supplying brake pressure to the brakes from a fluid pressure supply in accordance with a brake operating signal; and a skid controller controlled by the skid control instructions for controlling the brake pressure in a plurality of cycles each of which comprises a pressure reduction phase and a pressure increase phase, and a first comparitor to compare the co-efficient of friction of the lower friction surface with a predetermined threshold, and/or a second comparitor to compare the relative values of the co-efficients of friction of the surfaces with which at least two of the wheels are engaged and a device to operate the skid controller in a select low mode if the comparitors determine that a) the co-efficient of friction of the lower friction surface is above a predetermined absolute level, and/or b) the co-efficients of friction of the surfaces with which at least two of the wheels are engaged differ by less than a predetermined amount, and in a select high mode if the comparitors determine that a) the co-efficient of friction of a lower friction surface is at or below a predetermined absolute level, and/or b) the co-efficients of friction of the surfaces differ by at least the predetermined amount.

19 Claims, 5 Drawing Sheets

VEHICLE BRAKING SYSTEM

BACKGROUND TO THE INVENTION

This invention relates to a vehicle braking system comprising at least one brake control channel comprising a controller responsive to wheel speed signals from at least two wheel speed sensors, for sensing skid conditions of at least two wheels and for generating skid control instructions, a plurality of wheel brakes responsive to fluid pressure, hereinafter referred to as brake pressure, supplied thereto, a supply means, comprising a common supply valve, for supplying brake pressure to said brakes from a fluid pressure supply in accordance with a brake operating signal and a skid control means controlled by said skid control instructions for controlling the brake pressure in a plurality of cycles each of which comprises a pressure reduction phase and a pressure increase phase and may also comprise a pressure hold phase between the pressure reduction and increase phases.

For example, the channel or each channel may comprise two wheels at opposite ends of a common axle or may comprise two wheels at the same end of different axles. The wheels may be of any type, e.g., driven, steered or load carrying.

When a "split co-efficient of friction situation" arises, i.e., when one wheel of a channel system is engaged with a surface having a co-efficient of friction which is higher (higher friction surface) than the co-efficient of friction of a surface with which another wheel is engaged (lower friction surface), it has been known to select one of the wheels as the wheel which controls the operation of the skid control means. If the wheel engaged with the lower friction surface or a lower friction surface is selected (known as "select low mode") then, when the brakes are applied the skid control means is operated, in dependence on the controller detecting a skid condition of the wheel engaged with the lower friction surface, to cause the common supply valve to control brake pressure to reduce the braking effect on all the wheels of the channel. Where the channel comprises more than two wheels normally the skid control means is controlled by the wheel engaged with the lowest friction surface, i.e., the first wheel to skid. However, if desired, any surface other than the highest friction surface may be selected if desired and such surface is referred to herein as the lower friction surface.

In a select low mode the controller controls the brake pressure of the wheels in accordance with skid conditions of the wheel engaged with the lower friction surface. This causes a reduction in the braking effect of the wheel(s) engaged with the higher friction surface or each higher friction surface so that overall braking effect is reduced and the retardation is approximately equivalent to the wheels being engaged with the lower friction surface.

Alternatively, if the wheel engaged with a higher friction surface is selected (known as "select high mode"), then when the brakes are applied the skid control means is operated in dependence on the controller detecting a skid condition of the wheel engaged with the higher friction surface, to cause the common supply valve to control brake pressure to reduce the braking effect of the wheels.

When the channel comprises more than two wheels normally the skid control means is controlled by the wheel engaged with the highest friction surface, i.e., when all the wheels have skidded. However, if desired, any surface other than the lowest friction surface may be selected if desired and such surface is referred to herein as the higher friction surface.

In a select high mode the controller controls the brake pressure of the wheels in accordance with skid conditions of the wheel engaged with the higher friction surface. This causes the wheel(s) on the lower friction surface or each lower friction surface to continue to skid. In these circumstances, whilst the wheel(s) engaged with the lower friction surface or each lower friction surface contributes significantly to retardation of the vehicle, this wheel provides little stability, although by providing skid control to the wheel(s) engaged with the higher friction surface(s) retardation is maximized from the wheel(s) engaged with the higher friction surface(s) and overall stability is maintained.

SUMMARY OF THE INVENTION

An object of the present invention is to provide a vehicle braking system whereby the disadvantages of the above described "select high" and "select low" systems are overcome or are reduced.

According to a first aspect of the present invention we provide a vehicle braking system comprising a controller responsive to wheel speed signals from at least two wheel speed sensors, for sensing skid conditions of at least two wheels and for generating skid control instructions, a plurality of wheel brakes responsive to fluid pressure, hereinafter referred to as brake pressure, supplied thereto, a supply means, comprising a common supply valve, for supplying brake pressure to said brakes from a fluid pressure supply in accordance with a brake operating signal and a skid control means controlled by said skid control instructions for controlling the brake pressure in a plurality of cycles each of which comprises a pressure reduction phase and a pressure increase phase, and first comparison means to compare the co-efficient of friction of the lower friction surface with a predetermined threshold and/or second comparison means to compare the relative values of the co-efficients of friction of the surfaces with which at least two of the wheels are engaged and means to operate the skid control means in a select low mode if said comparison means determines that a) the co-efficient of friction of the lower friction surface is above a predetermined absolute level, and/or b) the co-efficients of friction of the surfaces with which at least two of the wheels are engaged differ by less than a predetermined amount, and a select high mode if said comparison means determines that a) the coefficient of friction of a lower friction surface is at or below a predetermined absolute level, and/or b) the co-efficients of friction of said surfaces differ by at least said predetermined amount.

The system may comprise said first and said second comparison means and means to operate the skid control means in a select low mode if said comparison means determines that a) the co-efficient of friction of the lower friction surface is above a predetermined absolute level, and/or b) the co-efficients of friction of the surfaces with which at least two of the wheels are engaged differ by less than a predetermined amount, and a select high mode if said comparison means determines that a) the co-efficient of friction of a lower friction surface is at or below a predetermined absolute level, and/or b) the co-efficients of friction of said surfaces differ by at least said predetermined amount.

The system may comprise means to monitor which wheel first encounters a skid condition when the brake pressure is increased in a pressure increase phase subsequent to a pressure reduction or holding phase pursuant to the detection of the first skid condition, and means to monitor the co-efficient of friction of the higher friction surface and in a second or greater skid occurrence of said wheel which first encountered a skid condition.

The system may comprise means to monitor the co-efficient of friction of the higher friction surface wherein the second comparison means comprises means to control the brake pressure above a threshold for a limited time period, and the system comprising:

i) means to cause the controller to adopt a select high mode in response to a skid condition of the wheel engaged with said higher friction surface being above a threshold during the limited time period, ii) means to cause the controller to adopt a select low mode, in response to a skid condition of the wheel engaged with said higher friction surface being below the threshold during limited time period.

The system may comprise means to effect a pressure reduction phase until the wheels have recovered to within a predetermined speed of vehicle speed in response to detection of a skid condition of the wheel engaged with said higher friction surface during the limited time period so that the controller adopts a select low mode.

The first comparison means may comprise means to compare the speed of the wheels with a threshold and to cause the controller to be in select low mode if the speed of the wheel engaged with the lower friction surface is (low friction wheel) at or above the threshold.

The first comparison means comprises means to compare the acceleration of the wheel with a threshold if the speed of the low friction wheel is below the threshold, and to cause the controller to be in a select low mode if the acceleration is at or above the threshold and to cause the controller to be in a select high mode if the acceleration is below the threshold.

Said means to control the brake pressure during said limited time period may be operable so as to a) decrease during the time period but at a lower rate than in the previous recovery phase, or b) remain constant during the limited time period, or c) increase during the time period.

The means to control the brake pressure may be operable so that when the brake pressure is increased it is increased at the same rate, or at a faster rate, or at a slower rate than in the previous pressure increase phase.

The system may comprise means to hold the brake pressure, or to further reduce and then hold the brake pressure to allow recovery of said wheel previously engaged with the lower friction surface in response to the controller being in a select high mode, and, during a pressure reduction phase or a pressure holding phase, the controller detecting acceleration of the wheel previously engaged with the lower friction surface, as a result of the co-efficient of friction of the higher and lower friction surfaces converging.

The system may comprise means further to reduce the brake pressure and optionally to then hold the brake pressure, to allow full recovery of the other wheel engaged with the lower friction surface in response to the controller being in a select high mode, and, during a pressure reduction phase or a pressure holding phase, the controller detecting that acceleration of the wheel previously engaged with a higher friction surface is within a predetermined acceleration of the acceleration of the wheel previously engaged with the low friction surface and/or is below a predetermined level, as a result of the co-efficient of friction of the higher and lower surfaces converging.

The system may comprise means, operative when the controller is in a select high mode, to compare the speed of the wheel engaged with the lower friction surface (low friction wheel) with a threshold, and means to cause the controller to adopt select low mode if the speed is at or above the threshold.

The system may comprise means to compare the speed of the high friction wheel with a threshold, if the speed of the low friction wheel is below the threshold, and means to cause the controller to maintain select high mode if the speed of the high friction wheel is greater than or equal to the threshold and means to cause the controller to compare the acceleration of the high friction wheel with a threshold if the speed of the high friction wheel is less than the threshold.

The system may comprise means to cause the controller to maintain select high mode if the acceleration of the high friction wheel is greater than or equal to the threshold and to adopt select low mode if the acceleration of the high friction wheel is less than the threshold.

The wheels may be steered wheels and means are provided to limit the brake pressure after the wheel engaged with the lower friction surface has skidded.

Said means to limit the brake pressure may end the pressure increase phase after a predetermined time and then hold the brake pressure at that pressure.

The second comparison means may comprise means to compare the speed of the wheel engaged with the higher friction surface (high friction wheel) with a threshold during a test procedure in which the brake pressure is maintained above a threshold for a limited time period and means to cause the controller to maintain select low mode if the speed of the high friction wheel is less than said threshold and to cause the controller to adopt a select high mode if the speed of the high friction wheel is greater than or equal to the threshold.

BRIEF DESCRIPTION OF THE DRAWINGS

Embodiments of the invention will now be described in more detail by way of example, with reference to the accompanying drawings.

DESCRIPTION OF THE PREFERRED EMBODIMENTS

Referring now to the Figures.

Figure 2:
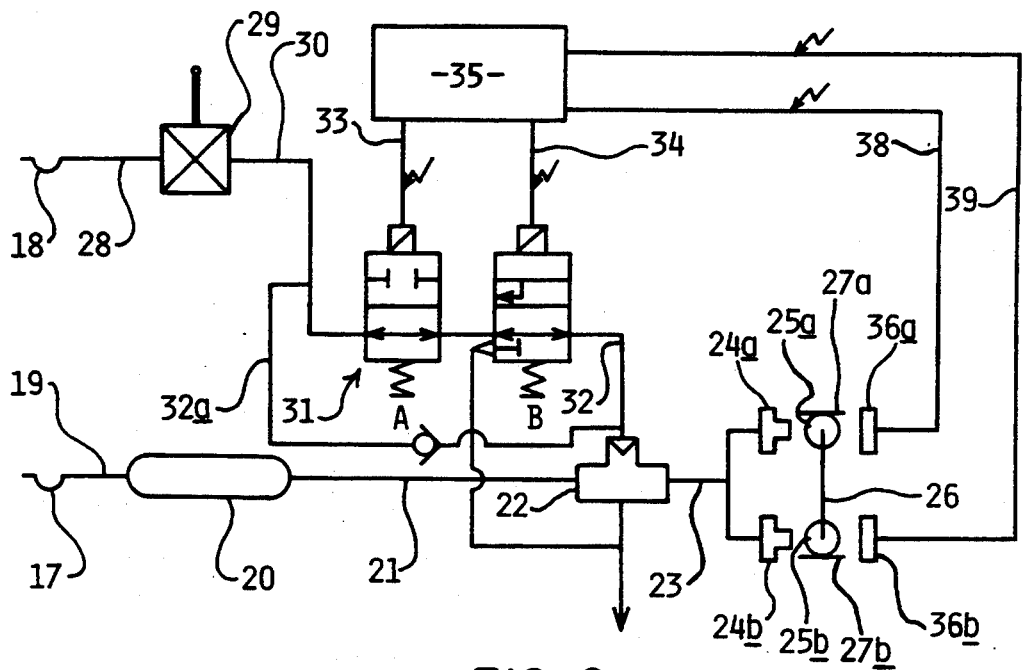
FIG. 2 is a circuit diagram showing the braking system of the vehicle of FIG. 1.
Figure 1:
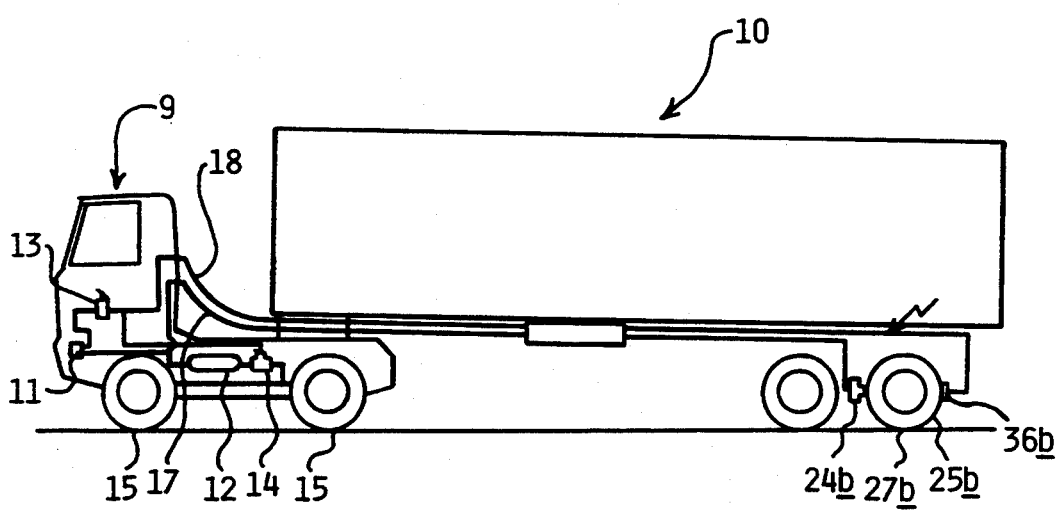
FIG. 1 is a diagrammatic illustration of a vehicle having a braking system embodying the invention.

In FIG. 1 there is shown a tractor 9 to which a trailer 10 is hitched by a conventional third wheel coupling in conventional manner. The tractor is provided with a conventional air brake system comprising an air compressor 11, a reservoir 12 for storing compressed air, a driver operated foot brake command valve 13 which supplies a brake command signal to relay valve means 14 on the tractor which cause air to be supplied from the reservoir 12 to brakes of the wheels 15 of the tractor. A main air supply is provided to the trailer 10 via a conventional coupling 17 whilst a brake command signal from the pedal 13 is also supplied to the trailer 10 via a conventional coupling 18.

The main air supply via the coupling 17 is supplied via a line 19 on the trailer to a reservoir 20 and via line 21 to a relay valve 22 which provides a common supply valve to supply brake pressure via a line 23 to two wheel brakes 24a, 24b for wheels 25a, 25b on opposite ends of an axle 26 of the trailer. The wheels 25a 25b are engaged with surfaces 27a, 27b respectively. As the vehicle is driven the co-efficient of friction of the surfaces may change in both absolute and relative terms.

The trailer has a single channel brake control system 30 in which the brake command signal is fed via a line 28 to a load sensing valve 29 and via line 30 to a skid control means 31 which comprises two solenoid valves A, B. A one-way bi-pass line 32a may be provided between the line 32 and the line 30 to enable brake demand reduction even if the solenoid valves A, B are in a hold condition, hereinafter to be described. The valve A comprising a holding valve which, when energized, prevents flow of air in either direction through the valve whilst the valve B is an exhaust valve which, when energized, permits of exhaust of air via a line 32 connected to the control side of the relay valve 22.

The line 32 therefore provides a brake operating signal to the relay valve 22 which is dependent upon the brake command signal on the line 28 but modulated by the skid control means 31. The skid control means are controlled by skid control instructions provided on electrical lines 33, 34 extending from an electronic controller 35. The electronic controller 35 comprises a microcomputer which, in the present example, on a single chip provides a central processor unit (CPU) connected by an address bus and a data bus to a random access memory (RAM) serving as a working store and a programmable read only memory (PROM) serving as a store for an operating programme of the system, together with input and output ports for input and output of signals. If desired, these features of the electronic controller 35 may be realized in any other suitable manner.

Figure 6:
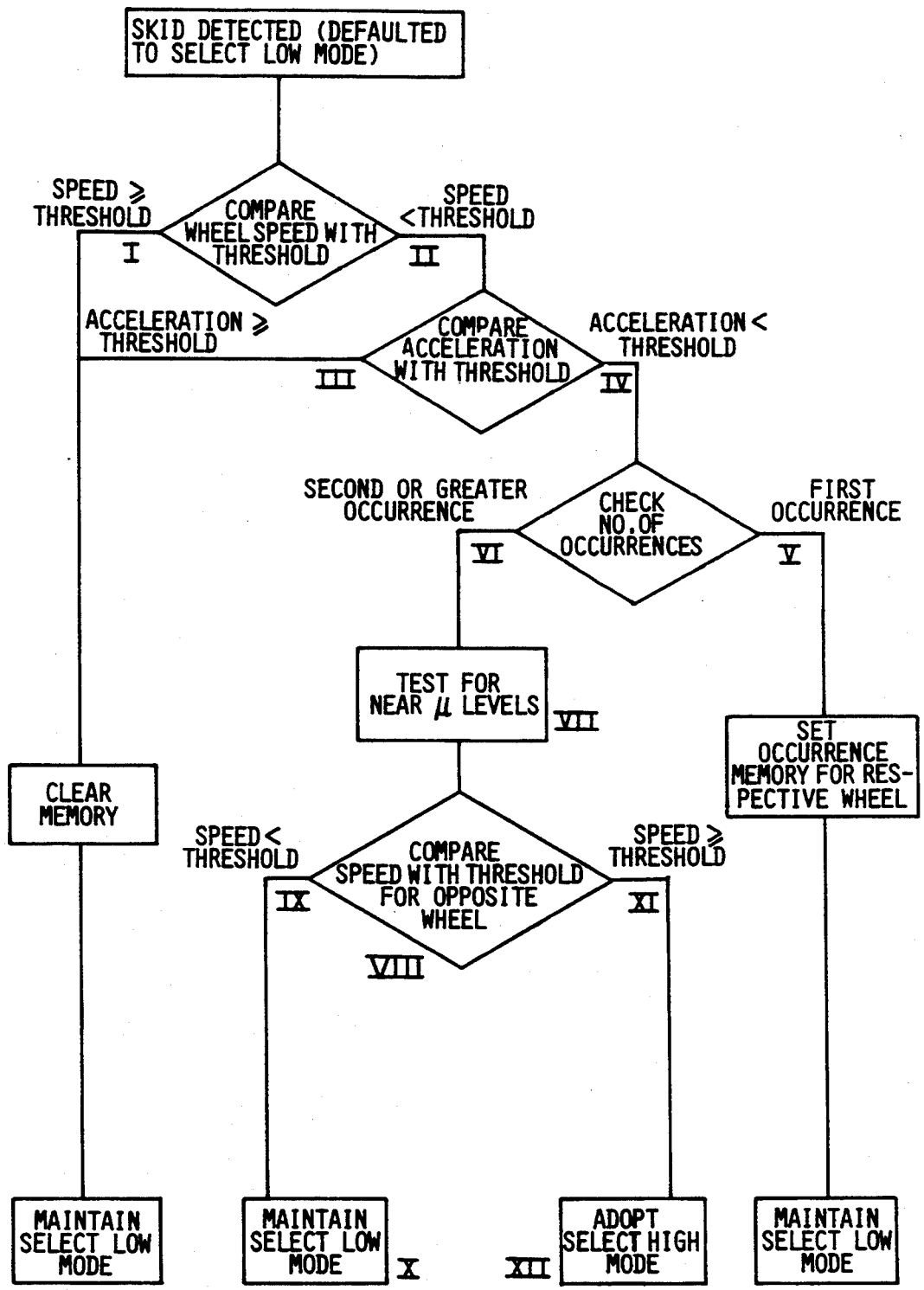
FIG. 6 is a diagrammatic representation of the function of an algorithm for selection between a select low mode and a select high mode.
Figure 7:
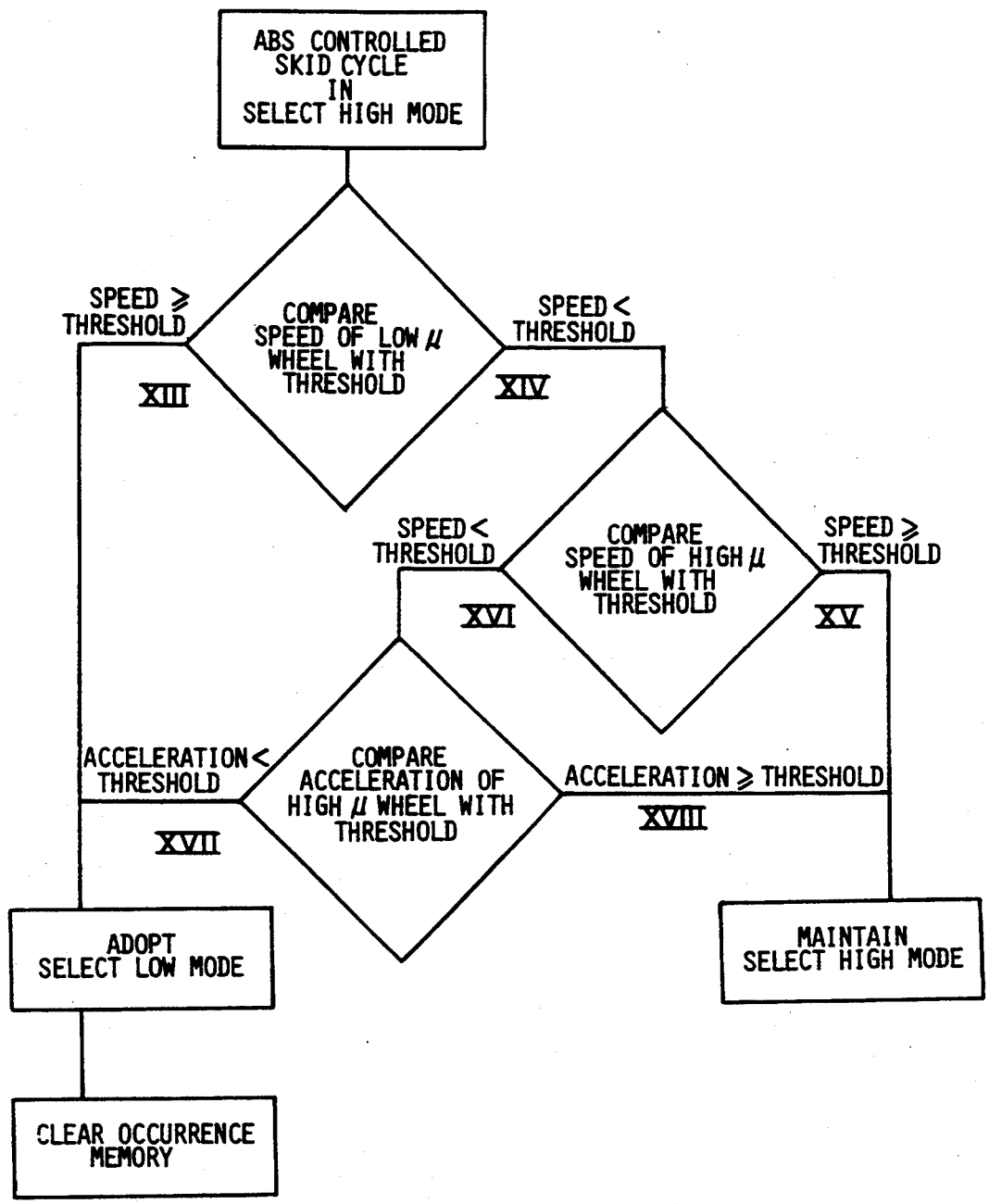
FIG. 7 is a diagrammatic representation of the function of an algorithm for selection between a select high mode and a select low mode.

The PROM is programmed with an algorithm which provides a means to control the brake system of the present invention and to provide conventional ABS control and in particular to adopt a select high mode or a select low mode. FIG. 6 illustrates the function of the algorithm in selecting between a select low and a select high mode and FIG. 7 illustrates the function of the algorithm in selecting between a select high mode and a select low mode. The electronic controller is supplied with wheel speed signals on electrical lines 38, 39 from Sensors 36a, 36b which sense the speeds of the wheels 25a, 25b respectively.

Figure 3:
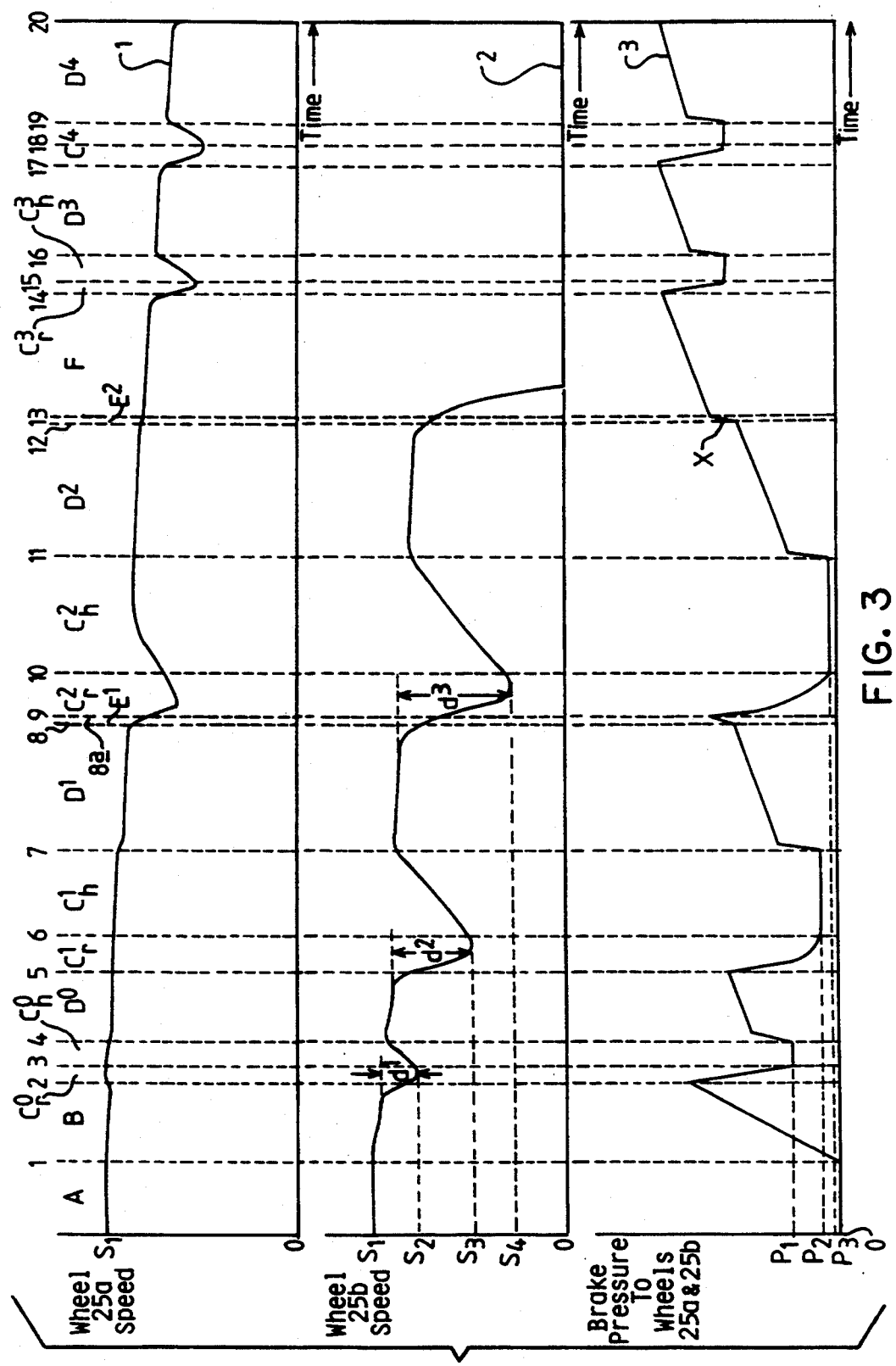
FIG. 3 is a graphical representation showing the variation of brake pressure with time and the corresponding variation of wheel speed with time for a wheel engaged with a high friction surface and a wheel engaged with a low friction surface in a braking system embodying the present invention.

Referring now to FIG. 3, there is shown in the line marked 1 the speed of rotation, plotted against time, of one of the wheels 25a, 25b, whilst the line marked 2 similarly plots the speed of rotation of the other wheel in the present example the lines marked 1 & 2 show the variation in speed of the wheel 25a and the wheel 25b respectively. In the present example, the wheel 25a is engaged with a surface having a co-efficient of friction which is higher than the co-efficient of friction of the surface with which the wheel 25b is engaged.

The line marked 3 plots the Variation in brake pressure against time. The brake pressure is the pressure of the air in the line 23 which extends to the brakes 24a, 24b.

In the region A the driver has not demanded any braking with the valve 13 and therefore the brake pressure is zero and the wheels 25a, 25b are rotating at the same or similar speeds $S_1$, $S_1$ (corresponding to vehicle speed) which results from non-skidding engagement of the wheels 25a, 25b with surfaces 27a, 27b respectively. At point 1 the brakes are applied and in region B there is shown increase in brake pressure supplied to the brakes 24a, 24b in the line 23 as a result of the driver demanding brake application by depressing the foot valve 13 and hence providing a brake command signal via the connection 18 along line 28, load valve 29, line 30, skid control unit 31 and line 32 to the control side of the relay valve 22. At this stage the skid control unit 31 permits free flow of the brake command signal since, as can be seen from lines 1 and 2, the wheels are still rotating at a speed corresponding to vehicle speed since. There is as yet no skidding, although the absolute value of the speed is somewhat decreased as a result of commencement of slowing of the vehicle.

At point 2 the wheel 25b is engaged with the surface 27b which has a co-efficient of friction which is lower than that of the surface 27a by a relatively small amount and so the wheel 25b commences to skid relative to the surface 27b. In the present example the wheel does not stop rotating but it slows to a speed $S_2$.

As a result of the sensor 36b detecting the onset of skidding of the wheel 25b the controller 33 sends skid control instructions to the solenoids A, B so as to energize the solenoid valves A and B to reduce the brake pressure during a pressure reduction phase $C^0r$ until the brake pressure is reduced to a pressure $P_1$ at point 3 which is sufficient to stop the wheel skidding and allows it to recover to its normal rolling speed.

During a recovery phase $C^0h$ from point 3 to point 4, the pressure is held constant at pressure $P_1$, the wheel 25b accelerates, and the sensors 36a, 36b send signals of wheel speed to the controller 35 which compares the speeds of the wheels with a threshold value. In this case, the speed of the wheel 25b is at or above the threshold value and so the controller is caused to maintain select low mode as shown at Stage I of the algorithm shown in FIG. 6.

Alternatively, the co-efficient of friction of the surface at the stage of skid of depth $d_1$ may be such that the controller determines that the wheel speed is less than the threshold value (Stage II) and in this case the controller compares the acceleration of the wheel 25b with a threshold acceleration and if the acceleration of the wheel is equal to or greater than the threshold value, the controller again maintains a select low mode (Stage III).

When the speed of the wheel 25b has recovered to within a predetermined level of vehicle speed (point 4), determined either by the memory of the vehicle speed prior to skidding and/or the speed of the vehicle as determined by the speed of rotation of the wheel 25a, the controller 35 supplies skid control instructions to the solenoid valves A, B so as to cause the brake pressure to rise from the level $P_1$ in a predetermined regime to a level determined by the acceleration of the deepest skid wheel during a pressure increase phase $D^0$. The controller 35 initially provides a signal to the valves A and B so that they are both de-energized to cause a flow of brake command signal so that brake pressure is increased and then the solenoid A will be energized so as to hold the pressure for a predetermined time followed by energization of the solenoid B to further increase the pressure so that the pressure is increased stepwise. In the Figures the individual steps are not shown but the line 3 shows the "integrated" effect of the steps. As shown in section $D^0$ the pressure is not increased stepwise at a constant rate but according to a predetermined regime which depends on the acceleration of the deepest skid wheel. In the present example the first part of the increase, i.e., steepest part of the line 3 in the region $D^0$, depends upon the rate of acceleration, whilst the second part above the knee is, in the present example, constant, but other regimes may be used if desired.

As the pressure increases, the wheel 25b, just before the line 5 in FIG. 3, engages with a portion of the surface 27b having a lower co-efficient of friction than that with which it was engaged at point 2 and so the wheel 25b starts to skid at a lower brake pressure than that occurring at point 2. The algorithm of FIG. 6 is re-started and the controller determines that the wheel speed is less than the threshold (Stage II) and that the acceleration is also less than the threshold (Stage IV). The controller also determines that this is the first occurrence of these conditions (Stage V). Thus, in this case the controller 35 has determined that at the first skid of depth $d_1$, the wheel 25b was engaged with the surface 27b having a co-efficient of friction above a predetermined level, as a result of the speed of the wheel being above a threshold value or below a threshold value and the acceleration of the wheel being at or above a threshold value in the region $C^0h$ but the surface 27b at skid of depth $d_2$ has a co-efficient of friction below the predetermined level and because this is the first occurrence the controller 35 maintains select low and provides skid control instructions to the solenoid valves A and B in a similar manner to those provided in the regions $C^0r$ and $C^0h$ as illustrated in regions $C^1r$ and $C^1h$. In this case the skid is of greater depth, $d_2$ and hence the brake pressure is held in the region $C^1h$ for a longer period because the wheel takes longer to recover.

Again, when the wheel has recovered to within a predetermined level of vehicle speed (point 7), determined either by the memory of the vehicle speed prior to skidding and/or the speed of the vehicle as determined by the speed of the rotation of the wheel 25a, the controller 35 provides skid control instructions to the solenoid valves A, B so as to cause the brake pressure to rise from the level $P_2$ to a predetermined pressure determined by the acceleration of the deepest skid wheel during a second pressure increase phase $D^1$. Again, the pressure is increased stepwise and in a 2 phase regime as in the region $D^0$.

As the pressure increases, the wheel 25b which is still engaged with a surface 27b of the same co-efficient of friction as before, again starts to skid, as shown at $d^3$. The algorithm is re-started and the controller again determines that the wheel speed is less than the threshold II and that the acceleration is less than the threshold IV and checks that this is the second occurrence of such conditions VI. This causes the controller to test the relative difference between the co-efficients of friction at the surfaces 27a and 27b VII.

This is done by the controller providing skid control instructions to the solenoid valves A and B to cause the pressure to increase for a limited period as indicated in the region $E^1$ between the points 8 and 9 instead of causing the pressure to decrease, as occurred at points 2 and 5. The time period is predetermined and may be, for example, in the range 50 to 100 ms.

In the present example, the pressure is increased at a greater rate than it was increased over the second part of the region $D^1$. If desired, however, the pressure may be increased at the same rate as over the second part of the region $D^1$ or at a lower rate, or may be held constant at the pressure of the point 8, or indeed may be decreased from the pressure at the point 8 but at a slower rate than it was decreased at the points 2 and 5.

Such control of the brake pressure for a limited time period, i.e., region $E^1$, so that the brake pressure does not fall at a rate which is equal to or greater than the rate at which it fell in the previous pressure reduction phase $C^1r$ causes the braking effect on both of the wheels not to decrease as fast as in the region $C^1r$ so that the wheel 25b continues to skid and skidding may take place of the wheel 25a depending upon the magnitude of the difference between the co-efficient of friction of the surfaces 27a and 27b. The controller compares the speed of the wheel 25a with a threshold value VIII.

In the present situation the co-efficient of friction of the surface 27a is only slightly higher than that of the surface 27b and hence the wheel 25a begins to skid at the point 8a. If during, or within a predetermined time after the end of, the limited time period, i.e., at the point 9, the controller 35, recognizes a skid condition of the wheel 25a (by virtue of the speed of the wheel 25a being below the threshold value IX), the controller adopts a select low mode X and skid control instructions are supplied to the solenoids A and B in a similar manner as indicated in the region $C^0r$ and $C^1r$ so as to perform a pressure reduction phase of a third cycle. The reduction in pressure occurs up to the point 10, i.e., region $C^2r$.

It will be noted that the speed of the wheel 25b fell, whilst the wheel 25a has already nearly recovered. When the brake pressure has fallen to the level $P_3$ the wheel 25b starts to recover and on detection of the start of recovery the brake pressure is held until the wheel 25b recovers to within a predetermined speed of vehicle speed, see region $C^2h$. A second pressure increase phase then takes place at point 11 similar to that described hereinbefore in regions $D^0$ and $D^1$. This pressure increase phase is shown in region $D^2$.

The controller 35 re-starts the algorithm of FIG. 6 and by virtue of stages II, III and VI determines that the same conditions have occurred two or more times and hence the test for near co-efficient of friction levels is performed again VII.

In effect the controller determines which wheel had the deepest skid ($d_3$) in the region $C^2r$, the wheel 25b, and determines its acceleration so that when the controller 35 then senses that one of the wheels 25a, 25b again starts to skid by virtue of signals supplied by the sensors 36a, 36b, the controller 35 determines whether the wheel 25b was on a low friction surface by comparing the acceleration of wheel 25b with a threshold value and if it determines that the wheel 25b was engaged with a low friction surface, then the brake pressure is again controlled so that it does not fall at a rate which is equal to or greater than the rate at which it fell in the previous recovery phase, as shown in region $E^2$.

At this stage, it is assumed, in the present example, that the wheel 25a has become engaged with a surface 27a of significantly greater co-efficient of friction than the surface 27b and thus when the pressure is thus increased over the limited time period $E^2$ no skidding of wheel 25a is detected, i.e., the wheel speed is equal to or above the threshold XI.

Accordingly the controller 35 adopts a select high mode XII and so the brake pressure continues to rise beyond point 13 at the end of region $E^2$ over the region F to the point 14 where skidding of the wheel 25a takes place. Of course, the wheel 25b is already skidding from just before the point 12 onwards. The controller 35 then provides skid control instructions to the solenoid valves A and B to reduce the pressure over the region $C^3r$ from point 14 to point 15 and hold the pressure over a region $C^3h$ so as to cause the wheel 25a to stop skidding and to recover towards the vehicle speed, which it attains at point 16. The pressure is then again increased in a pressure increase phase shown in region $D^3$. The wheel 25b continues to skid.

Repeated cycles of pressure decrease and increase, resulting in successive cycles of deceleration and acceleration of the wheel 25a are then carried out in conventional manner, one of which is shown at regions $C^4r$, $C^4h$ and $D^4$.

If on continued increase in pressure in region F the wheel 25a does not skid, then after a predetermined time, for example 1.5 seconds a "time out" condition occurs and the system reverts to a select low mode.

If desired, the higher friction wheel, i.e., the wheel engaged with the high friction surface, may be controlled on the basis of the adjustable detection thresholds so as to not compromise the stability of the vehicle. That is to say, the threshold at which the sensor 36a associated with the wheel 25a senses that the wheel 25a starts to skid is adjusted so as to advance the skid detection point so that a shallower skid is achieved and hence a greater stability or steering ability is provided.

Figure 5:
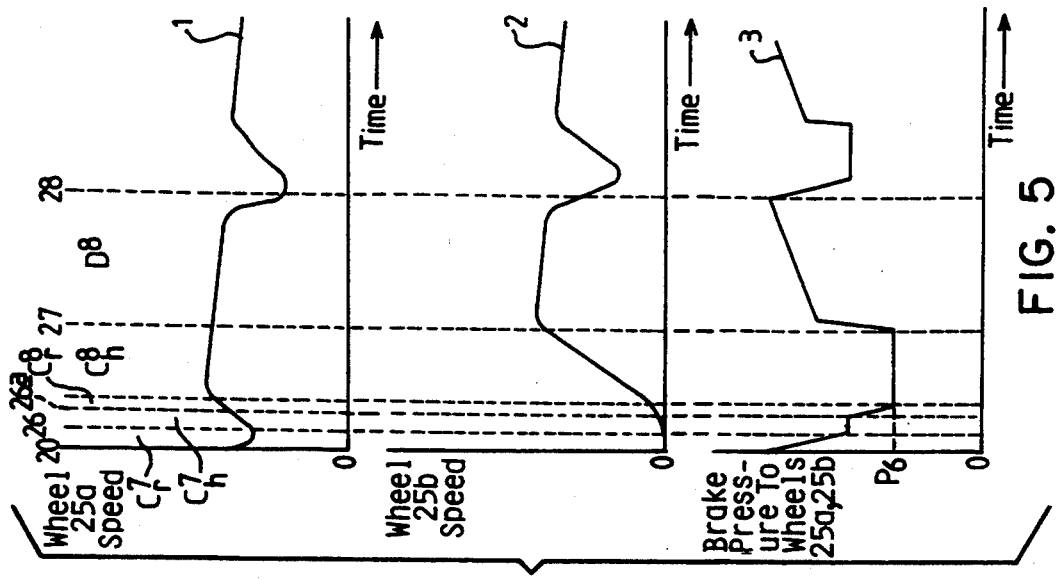
FIG. 5 is a graphical representation similar to that of FIG. 3 but showing the conditions obtaining when a wheel previously engaged with a low friction surface becomes engaged with a higher friction surface.
Figure 4:
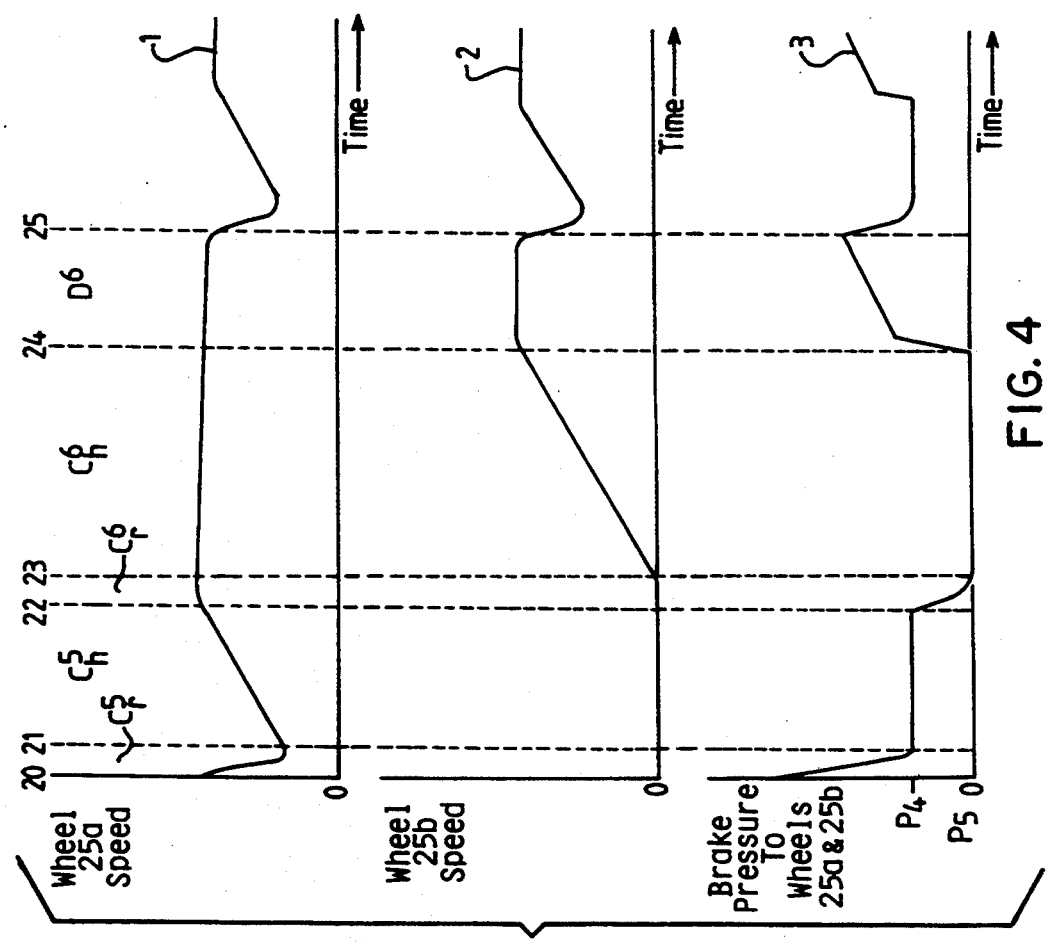
FIG. 4 is a graphical representation similar to that of FIG. 3 but showing the conditions obtaining when a wheel previously engaged with a high friction surface passes into engagement with a lower friction surface.

FIG. 7 illustrates the functions of an algorithm with which the controller is programmed to control the system during the sequence illustrated in FIGS. 4 and 5.

Using the algorithm illustrated in FIG. 7, the controller compares the speed of the wheel engaged with the lower friction surface, i.e., in this example 25b, with a threshold. If the speed is greater or equal to the threshold, indicating that the co-efficient of friction of the surface with which the wheel 25b has increased, then the controller is caused to adopt the select low mode and the occurrence memory is cleared (Stage XIII).

Alternatively, if the speed comparison is less than the threshold which indicates that the low friction wheel is still skidding (Stage XIV) the controller compares the speed of the wheel engaged with the high friction surface, i.e., the wheel 25a, with a threshold. If this speed is greater than or equal to the threshold (Stage XV) the controller is caused to maintain the select high condition Alternatively, if the speed is less than the threshold (Stage XVI) the controller is caused to compare the acceleration of the same wheel with a threshold.

If the acceleration is less than the threshold (Stage XVII) the controller is again caused to adopt select low and the occurrence memory is cleared. Alternatively, if the acceleration is greater than or equal to the threshold (Stage XVIII) the controller is caused to maintain select high.

Referring now to FIG. 4, this illustrates the conditions obtaining where the wheel 25a becomes engaged with a lower friction surface 27a after having been previously engaged with a higher friction surface 27b, as described in the regions F–$D_4$ of FIG. 3.

FIG. 4 is a continuation of FIG. 3 starting at point 20, i.e., the end of region $D_4$.

In this example the wheel 25a at point 20 runs onto a lower friction surface which causes the wheel 25a to skid (Stage XIV). The algorithm then follows Stages XVI and XVII. This will cause the controller 35, which was in a select high condition, to provide skid control instructions to the valves A, B so as to reduce the brake pressure over the region $C^5r$ down to pressure $P_4$ at the point 21. At a pressure $P_4$ the wheel 25a has just started to recover, and the wheel 25b being already engaged with a low friction surface 27b will continue to skid.

Because the surface 27a is now a relatively low friction surface the acceleration of the wheel 25a was sensed as being below a predetermined acceleration (Stage XVII) or if it is near to the last low friction wheel recovery acceleration which was previously recorded in the memory, the controller 35 causes the brake pressure to be dropped further, at point 22 and adopts the select low mode.

The pressure falls over the region $C^6r$ to pressure $P_5$ until the sensor 36b senses an increase in the speed of the wheel 25b and then the controller signals the valves A and B to hold the pressure at point 23.

During the holding phase $C^6h$ the wheel 25b recovers to within a predetermined speed of vehicle speed and then a pressure increase phase $D^6$ starts at point 24 in the usual 2 phase form. The controller 35 enters a select low mode upon sensing the onset of skidding of the next wheel to skid at just prior to point 25. Whereupon the sequence described hereinbefore, beginning at point 2 or point 5 of FIG. 3, according to the friction conditions, may be repeated.

Referring now to FIG. 5. This is again a continuation of FIG. 3 beyond point 20 but illustrating an alternative set of conditions to that illustrated in FIG. 4.

FIG. 5 illustrates the condition where the low friction wheel of FIG. 3, i.e., the wheel 25b, becomes engaged with a higher friction surface.

In this example, at the point corresponding to the point 20 of FIG. 3 the wheel 25a, which is on a relatively high friction surface, starts to skid, and so the controller 35, which is in a select high mode, reduces pressure, as shown in the region $C^7r$.

If during this pressure reduction stage the wheel 25b, which was previously on a low friction surface, runs onto a high friction surface, then the wheel 25b will start to accelerate as shown at point 26 and this is detected by the sensor 36b and according to the algorithm of FIG. 7 the speed of the wheel 25b will be detected to be at or above the threshold (Stage XIII) and hence the controller will adopt the select low mode and clear the occurrence memory. Thus, the controller 35 provides skid control instructions which initially holds the pressure, in region $C^7h$ and then further drops the pressure in region $C^8r$ to a predetermined pressure $P_6$ at point 26a which allows the wheel 25b to continue to recover and adopts a select low mode. The controller 35 then signals the valves A and B to hold the pressure over the region $C^8h$ up to point 27 whereat the speed of wheel 25b is within a predetermined speed of vehicle speed of the controller in normal manner. The wheel 25a meanwhile has also fully recovered. The pressure is then increased at point 27 in normal 2 phase manner in region $D^8$.

When a further skid condition of either of the wheels is detected, just prior to point 28 the controller 35 adopts a select low mode and the procedure described previously with regard to FIG. 3 is repeated starting at point 2 or point 5 of FIG. 3 depending on conditions.

In a third condition, not illustrated, the low friction wheel may again run on a low friction surface so that the algorithm of FIG. 7 detects that the speed is below the threshold, i.e., Stage XIV which causes the controller to compare the speed of the high friction wheel with the threshold and if the speed of the high friction wheel is detected as being above or equal to the threshold so that the high friction surface is above a predetermined co-efficient of friction level, then the controller maintains select high (Stage XV).

In a fourth condition, not illustrated, the low friction wheel may again run on a low friction surface so that the algorithm follows Stage XIV but when the controller compares the speed of the high friction wheel with the threshold, the speed of the high friction wheel is detected as being below the threshold (Stage XIV) so that the acceleration of the high friction wheel is checked and in this case it is greater than or equal to the threshold (Stage XVIII) so the system maintains select high.

When the wheels are steered wheels it is preferable to limit the brake pressure after the wheel engaged with the lower friction surface has skidded, e.g., locked. This may be achieved by ending the pressure increase phase $D^0$–$D_8$ after a predetermined time and then holding the brake pressure at that pressure.

Although in the above described example a common supply means in the form of a relay valve has been described, the pneumatic control signal to which is modulated by the skid control means, if desired, an in-line supply valve may be provided controlled by similar solenoid valves.

Furthermore, although in the above described example a single channel brake control system for the trailer has been described, if desired the trailer may be provided with a two, three or more channel system. The conditional select high/select low facility, the subject of the present invention, being provided for one or more of the channels Although in the above described example the single channel system is described as having two wheels having brakes operated by a common supply valve means, if desired the channel or one or more of the channels in a multi channel system may be provided with more than two wheels and associated brakes and sensors. Where a channel has more than two wheels and sensors the lowest friction surface engaged by a sensed wheel may be used as the lower friction surface described hereinbefore whilst the surface having the highest co-efficient of friction may be used as the higher co-efficient of friction surface described hereinbefore. Alternatively, any surface other than the surface having the lowest friction may be used as the higher friction surface whilst, conversely, any surface other than the highest friction surface may be used as the lower friction surface.

In such circumstances, the controller senses the accelerations of the various wheels and chooses a wheel having an appropriate acceleration in the hierarchy of accelerations according to instructions and uses such wheels to monitor the friction of the higher or lower friction surfaces with which they are engaged.

If desired only the first comparison means to compare the co-efficients of friction with a predetermined threshold or only the second comparison means to compare the relative values of the co-efficients of friction of the surfaces may be provided. Alternatively, other suitable combinations of such first and second comparison means may be provided to that described with reference to the drawings.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilized for realizing the invention in diverse forms thereof.

Having described the invention, what is claimed is:

1. A vehicle braking system comprising:
   (i) at least two wheel speed sensors which generate wheel speed signals indicative of the speed of rotation of the respective wheel;
   (ii) a controller responsive to said wheel speed signals for sensing skid conditions of at least two wheels and for generating skid control signals;
   (iii) a fluid pressure supply;
   (iv) brake command means which when operated generate a brake operating signal;
   (v) a plurality of wheel brakes responsive to fluid pressure supplied thereto;
   (vi) a supply means, comprising a common supply valve, for supplying brake pressure to said brakes from said fluid pressure supply in accordance with said brake operating signal;
   (vii) skid control means responsive to said skid control instructions for controlling said brake pressure in a plurality of cycles each of which comprises a pressure reduction phase and a pressure increase phase;
   (viii) at least one comparison means selected from the group comprising:
      (a) first comparison means arranged to compare the co-efficient of friction of the lower friction surface with a predetermined threshold, and
      (b) second comparison means arranged to compare the relative values of the co-efficients of friction of the surfaces with which at least two wheels are engaged; and
   (ix) means to operate the skid control means in a select low mode if at least one condition is met from the group comprising:
      (a) the co-efficient of friction of the lower friction surface is above said predetermined threshold; and
      (b) the co-efficients of friction of the surfaces with which at least two wheels are engaged differ by less than a predetermined amount, and in a select high mode if at least one condition is met from the group comprising:

(a) the co-efficient of friction of the lower friction surface is at or below said predetermined threshold, and (b) the co-efficients of friction of the said surfaces differ by at least said predetermined amount.

2. A vehicle braking system according to claim 1 wherein the comparison means comprises said first and said second comparison means and means to operate the skid control means in a select low mode if said comparison means determines that at least one condition is met from the group comprising:

a) the co-efficient of friction of the lower friction surface is above a predetermined absolute level, and b) the co-efficients of friction of the surfaces with which at least two of the wheels are engaged differ by less than a predetermined amount, and a select high mode if said comparison means determines that at least one condition is met from the group comprising:

a) the co-efficient of friction of a lower friction surface is at or below a predetermined absolute level, and b) the co-efficients of friction of said surfaces differ by at least said predetermined amount.

3. A vehicle braking system according to claim 1 comprising means to monitor which wheel first encounters a skid condition when the brake pressure is increased in a pressure increase phase subsequent to a pressure reduction or holding phase pursuant to the detection of the first skid condition, and means to monitor the co-efficient of friction of the higher friction surface and in a second or greater skid occurrence of said wheel which first encountered a skid condition.

4. A vehicle braking system according to claim 1 comprising means to monitor the co-efficient of friction of the higher friction surface wherein the second comparison means comprises means to control the brake pressure above a threshold for a limited time period, and the system comprising:

i) means to cause the controller to adopt a select high mode in response to a skid condition of the wheel engaged with said higher friction surface being above a threshold during the limited time period, ii) means to cause the controller to adopt a select low mode, in response to a skid condition of the wheel engaged with said higher friction surface being below the threshold during limited time period.

5. A vehicle braking system according to claim 4 comprising means to effect a pressure reduction phase until the wheels have recovered to within a predetermined speed of vehicle speed in response to detection of a skid condition of the wheel engaged with said higher friction surface during the limited time period so that the controller adopts a select low mode.

6. A vehicle braking system according to claim 1 wherein the first comparison means comprises means to compare the speed of the wheels with a threshold and to cause the controller to be in select low mode if the speed of the wheel engaged with the lower friction surface is (low friction wheel) at or above the threshold.

7. A vehicle braking system according to claim 6 wherein the first comparison means comprises means to compare the acceleration of the wheel with a threshold if the speed of the low friction wheel is below the threshold, and to cause the controller to be in a select low mode if the acceleration is at or above the threshold and to cause the controller to be in a select high mode if the acceleration is below the threshold.

8. A vehicle braking system according to claim 1 wherein said means to control the brake pressure during said limited time period is operable so as to a) decrease during the time period but at a lower rate than in the previous recovery phase, or b) remain constant during the limited time period, or c) increase during the time period.

9. A vehicle braking system according to claim 8 wherein the means to control the brake pressure is operable so that when the brake pressure is increased it is increased at the same rate, or at a faster rate, or at a slower rate than in the previous pressure increase phase.

10. A vehicle braking system according to claim 1 comprising means to hold the brake pressure, or to further reduce and then hold the brake pressure to allow recovery of said wheel previously engaged with the lower friction surface in response to the controller being in a select high mode, and, during a pressure reduction phase or a pressure holding phase, the controller detecting acceleration of the wheel previously engaged with the lower friction surface, as a result of the co-efficient of friction of the higher and lower friction surfaces converging.

11. A vehicle braking system according to claim 1 comprising means further to reduce the brake pressure and optionally to then hold the brake pressure, to allow full recovery of the other wheel engaged with the lower friction surface in response to the controller being in a select high mode, and, during a pressure reduction phase or a pressure holding phase, the controller detecting that acceleration of the wheel previously engaged with a higher friction surface is within a predetermined acceleration of the acceleration of the wheel previously engaged with the low friction surface and/or is below a predetermined level, as a result of the co-efficient of friction of the higher and lower surfaces converging.

12. A vehicle braking system according to claim 1 comprising means, operative when the controller is in a select high mode, to compare the speed of the wheel engaged with the lower friction surface (low friction wheel) with a threshold, and means to cause the controller to adopt select low mode if the speed is at or above the threshold.

13. A vehicle braking system according to claim 1 comprising means to compare the speed of the high friction wheel with a threshold, if the speed of the low friction wheel is below a threshold, and means to cause the controller to maintain select high mode if the speed of the high friction wheel is greater than or equal to the threshold and means to cause the controller to compare the acceleration of the high friction wheel with a threshold if the speed of the high friction wheel is less than the threshold.

14. A vehicle braking system according to claim 13 further comprising means to cause the controller to maintain select high mode if the acceleration of the high friction wheel is greater than or equal to the threshold and to adopt select low mode if the acceleration of the high friction wheel is less than the threshold.

15. A vehicle braking system according to claim 1 wherein the wheels are steered wheels and means are provided to limit the brake pressure after the wheel engaged with the lower friction surface has skidded.

16. A vehicle braking system according to claim 15 wherein said means to limit the brake pressure may end the pressure increase phase after a predetermined time and then hold the brake pressure at that pressure.

17. A vehicle braking system according to claim 1 wherein the second comparison means comprises means to compare the speed of the wheel engaged with the higher friction surface (high friction wheel) with a threshold during a test procedure in which the brake pressure is maintained above a threshold for a limited time period and means to cause the controller to maintain select low mode if the speed of the high friction wheel is less than said threshold and to cause the controller to adopt a select high mode if the speed of the high friction wheel is greater than or equal to the threshold.

18. A vehicle braking system comprising:
 (i) at least two wheel speed sensors which generate wheel speed signals indicative of the speed of rotation of the respective wheel;
 (ii) a controller responsive to said wheel speed signals for sensing skid conditions of at least two wheels and for generating skid control signals;
 (iii) a fluid pressure supply;
 (iv) brake command means which when operated generate a brake operating signal;
 (v) a plurality of wheel brakes responsive to fluid pressure supplied thereto;
 (vi) a supply means, comprising a common supply valve for supplying brake pressure to said brakes from said fluid pressure supply in accordance with said brake operating signal;
 (vii) skid control means responsive to said skid control instructions for controlling said brake pressure in a plurality of cycles each of which comprises a pressure reduction phase and a pressure increase phase;
 (viii) comparison means arranged to compare the relative values of the co-efficient of friction of the surfaces with which at least two wheels are engaged and comprising means to control the brake pressure above a threshold for a limited time period;
 (ix) means to monitor the co-efficient of friction of the higher friction surface;
 (X) means to cause the controller to adopt a select high mode in response to the speed of the wheel engaged with the higher friction surface being above a threshold during the limited period; and
 (xi) means to cause the controller to adopt a select low mode in response to the speed of the wheel engaged with said higher friction surface being below the threshold during the limited time period.

19. A vehicle braking system according to claim 18 wherein said means to control the brake pressure during said limited time period is operable so as to
 a) decrease during the time period but at a lower rate than in the previous recovery phase, or
 b) remain constant during the limited time period, or
 c) increase during the time period.

* * * * *